Figure 1:
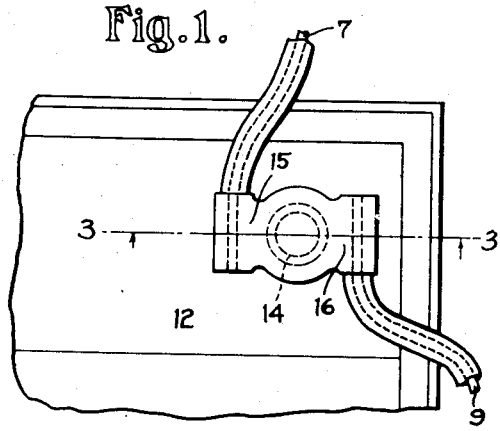

E. A. HALBLEIB.
STORAGE BATTERY SYSTEM.
APPLICATION FILED JAN. 16, 1913.

1,089,549.

Patented Mar. 10, 1914.

Witnesses:
E. W. Carroll
D. Gurnee

Inventor:
Edward A. Halbleib,
by his attorneys
Osgood, Davis & Dorsey

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

STORAGE-BATTERY SYSTEM.

1,089,549.  Specification of Letters Patent.  Patented Mar. 10, 1914.

Application filed January 16, 1913  Serial No. 742,495.

*To all whom it may concern:*

Be it known that I, EDWARD A. HALBLEIB, a citizen of the United States, and resident of Rochester, in the county of Monroe and State of New York, have invented certain new and useful Improvements in Storage-Battery Systems, of which the following is a specification.

This invention relates to electric systems of the type in which a storage-battery is employed in connection with translating-devices and an electric-generator, the storage-battery being constantly connected with both the translating-devices and the generator in such a manner as to alternatively receive and discharge current, according to the varying demands of the translating-devices and the varying out-put of the generator.

In systems of the type in question, particularly as employed in connection with portable apparatus carried by automobiles or other vehicles, it is common to actuate the generator by connection with the engine or other movable part of the vehicle, so that the out-put of the generator varies widely with the speed of the vehicle. In apparatus so employed, in order that the necessity for complicated regulating apparatus for the generator may be avoided, and also in order to provide a constant supply of current for the translating devices even when the vehicle is at rest and the generator is out of operation, it has been common to employ a storage-battery which is connected with the other parts of the apparatus in a manner commonly described as "floating" the battery "upon the line". That is to say, the terminals of the battery are connected in parallel with the generator-terminals and with the load-conductors through which the translating-devices are fed. In this arrangement either or both the generator and the battery are adapted to supply current to the translating-devices, according to varying conditions. For example, when the generator is operating at high speed, so as to provide a current, at high electromotive force, greater than that required by the translating-devices, or when the translating - devices are partially or wholly disconnected from the load-conductors and thrown out of operation, the current from the generator passes partly or wholly through the storage-battery, thus charging the battery. On the other hand, when the speed of the generator diminishes, or the demands upon the load-conductors increase so that the current supplied by the generator is insufficient, the battery automatically assumes a part of the load and discharges current through the load-conductors and the translating-devices, so as automatically to maintain the voltage of the load-circuit.

In addition to the functions just described, the battery operates effectively and automatically as a safety-device to prevent the subjection of the translating-devices to an excessive voltage. However fast the generator may operate, any tendency to produce an excessive voltage in the load-circuit is guarded against by the fact that a part of the current so produced may flow through the battery in a direction to charge it, the amount so flowing varying with the output of the generator and the consumption in the load-circuit, and consequently, long-continued excessive speed in the generator can result in nothing more serious than overcharging and gassing in the battery.

The protective action of the battery, just described, necessarily involves the connection of the battery in parallel with the other parts of the apparatus. In systems of the type in question as commonly arranged, however, there is danger of the accidental occurrence of breaks, in the electrical connections, by which the battery may be disconnected from the generator and the load-circuit while these portions of the apparatus still remain connected with each other. In such a case it is possible for an excessive electromotive force to be impressed upon the load-conductors, which may have the effect of injuring or destroying the translating-devices. Where these latter are electric-lights, for instance, they may thus be burned out, and this may occur without any warning, to the user of the apparatus, that the dangerous condition in question has arisen.

The danger of the effect just described is due to the fact that the electrical connections are usually made by connecting the generator-terminals and the load-conductors directly together, and then providing branch-conductors, or common connections to the battery-terminals. Such an arrangement is produced either where the conductors connecting the generator and the translating-devices are connected by branch-wires with the battery-terminals, or where a single binding-post on the battery-terminal is employed to secure the ends of conductors extending, respectively, from a generator-terminal and one side of the load-circuit. In either case it is possible, by a failure of the connection with the battery-terminal, for the generator and the load-conductors to remain connected together, with the results above described.

The object of the present invention is to provide a storage-battery system, of the type in question, with connections so constructed and arranged that it is practically impossible for the battery to become disconnected from the other parts of the apparatus without the occurrence, at the same time, of a break in the connections between the generator and the translating-devices. To this end I propose to connect each generator-terminal and the corresponding load-conductor with a battery-terminal, but to form these connections at separate points, so that there is no direct connection between the generator-terminal and the load-conductor, these parts being electrically connected only through the interposed battery-terminal. Accordingly, any break in the connections must involve the disconnection of the generator-terminal and the corresponding load-conductor, as well as the disconnection of the battery from one or both of these parts.

Figure 2:
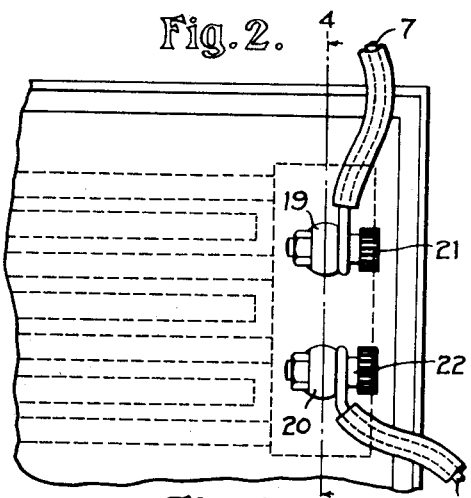
Figure 3:
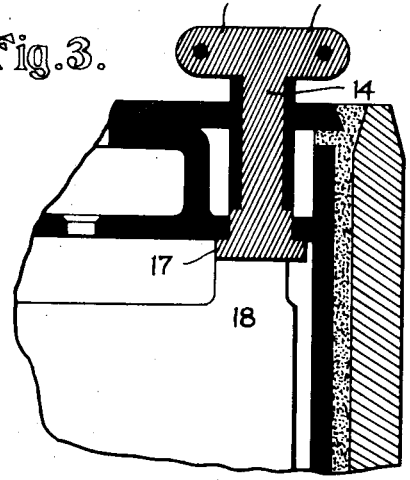
Figure 4:
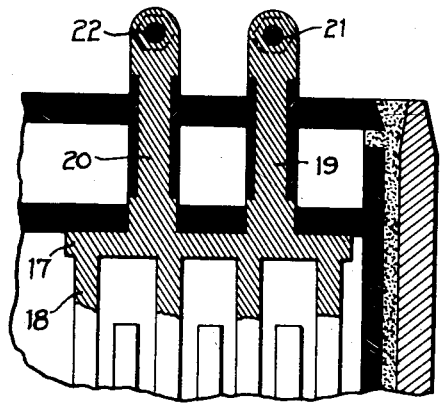

In the accompanying drawings: Figure 1 is a plan-view of a portion of a storage-battery, as employed in an electric system arranged in accordance with the present invention, showing particularly the connections between one of the battery-terminals and the other conductors of the system; Fig. 2 is a similar view, showing a modified form of the invention; Fig. 3 is a sectional view on the line 3—3 in Fig. 1; Fig. 4 is a sectional view on the line 4—4 in Fig. 2; and Fig. 5 is a diagram of the electrical connections of a storage-battery system embodying the present invention.

Figure 5:
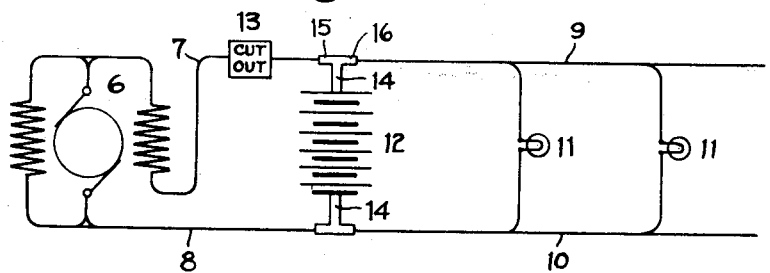

Referring to the diagram, Fig. 5, the generator 6, which may be of the ordinary compound-wound type, is connected, by wires 7 and 8, with the load-conductors or wires 9 and 10 across which translating-devices, such as electric-lamps 11, are connected in parallel. The storage-battery 12 is also connected in parallel with the generator. In the conductor 7 is introduced a reverse-current cutout 13, which may be of any ordinary or suitable form, and which operates in a well-known manner to prevent the flow of current in a reverse direction from the battery through the generator.

As shown diagrammatically in Fig. 5, one of the battery-terminals 14 is provided with two branches, to which the conductors 7 and 9 are independently connected at separate points, and these conductors are not connected directly together, the terminal 14 constituting their sole means of electrical intercommunication. The other battery-terminal 15 is similarly connected with the conductors 8 and 10.

Two specific constructions are illustrated, in Figs. 1 to 4, for interconnecting the battery-terminals and the other conductors of the system. In Figs. 1 and 3 a single terminal-projection 14 extends from the grids or plates 18 of the battery, this terminal-projection being formed substantially integral with these grids in any ordinary or suitable manner, as, for example, by casting or sweating it on a cross-bar 17, also integrally united with the grids 18. At its upper end the terminal-projection 14 is provided with two branches 15 and 16, which are perforated to receive the ends of the conductors 7 and 9, and these conductors may be secured in place by soldering or in any other convenient manner.

It will be apparent that with the construction illustrated in Figs. 1 and 3, if either or both of the conductors 7 and 9 should break loose, or become disconnected from the battery-terminal, this would result not only in disconnecting the battery from either the generator or the translating-devices, or from both but also in disconnecting the generator from the load-conductor and the translating-devices. Accordingly, any such break in the connections would cause the translating-devices to be deënergized, thus warning the operator of the break without subjecting the translating-devices to any dangerous flow of current.

Owing to the substantial character and integral construction of the battery-terminal 14 no break in this part is liable to occur, and the arrangement illustrated in Figs. 1 and 3 constitutes therefore a practical and satisfactory embodiment of the invention. If it be desired, however, to more completely isolate the conductors 7 and 9 from direct inter-connection, the construction shown in Figs. 2 and 4 may be employed. In this construction the cross-bar 17 on the grids 18 is provided with two entirely separate terminal-projections 19 and 20, to which the conductors 7 and 9 are connected, respectively, in any convenient manner, as, for example, by binding-posts 21 and 22. In case either conductor becomes accidentally detached from the corresponding binding-post, or in case either binding-post becomes detached from the corresponding terminal-projection, the conductors 7 and 9 are thereby electrically disconnected from each other, with the results above pointed out.

I claim:—

1. A storage-battery system comprising an electric generator, translating-devices, load-conductors connected with the translating-devices, generator-conductors connected with the generator, and a storage-battery having grids with integral terminal-projections, in which system the respective load-conductors and generator-conductors are connected with the respective terminal-projections of the battery so as to float the battery on the line; said system being characterized by the fact that at each of said terminal-projections of the battery the respective load-conductor and generator-conductor are isolated from each other and are connected directly to the terminal-projection at separate points, so that they may have no direct connection with each other in case either of said conductors becomes disconnected from the terminal-projection.

2. An electric system comprising an electric generator, translating-devices, load-conductors connected with the translating-devices, generator-conductors connected with the generator, and a storage-battery having grids provided with integral terminal-projections, in which system the respective load-conductors and generator-conductors are connected with the respective terminal-projections of the battery so as to float the battery on the line; said system being characterized by the fact that each of said terminal-projections has two branches, and that the respective load-conductor and generator-conductor are isolated from each other and are connected directly to said branches, respectively, so that they may have no direct connection with each other in case either of said conductors becomes disconnected from the terminal-projection.

EDWARD A. HALBLEIB.

Witnesses:
 D. GURNEE,
 C. W. CARROLL.